Figure 1:
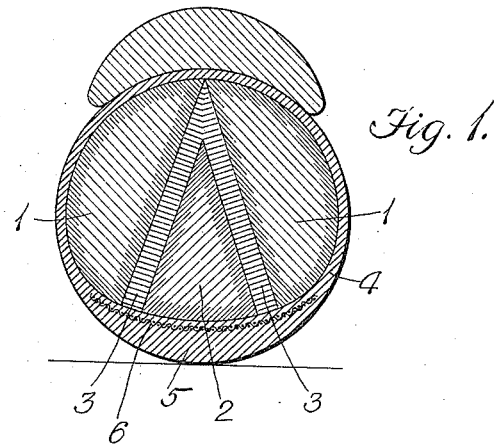

W. DRABOLD & A. P. MOTT.
TIRE.
APPLICATION FILED MAY 25, 1914.

1,137,124. Patented Apr. 27, 1915.

Witnesses
Chas. W. Stauffiger
Anna M. Dorr.

Inventors
Walter Drabold,
Augustus P. Mott,
By
Attorneys

UNITED STATES PATENT OFFICE.

WALTER DRABOLD AND AUGUSTUS P. MOTT, OF DETROIT, MICHIGAN.

TIRE.

1,137,124.   Specification of Letters Patent.   Patented Apr. 27, 1915.

Application filed May 25, 1914. Serial No. 840,669.

*To all whom it may concern:*

Be it known that we, WALTER DRABOLD and AUGUSTUS P. MOTT, citizens of the United States of America, residing at Detroit, in the county of Wayne and State of Michigan, have invented certain new and useful Improvements in Tires, of which the following is a specification, reference being had therein to accompanying drawings.

This invention relates to tires, and particularly to that type that depends upon solid elastic material for its resiliency, in contradistinction to pneumatic tires depending upon air.

The primary object of our invention is to provide tire elements connected by an elastic element which tends to stretch when pressure is brought to bear upon the tire, and the tire elements are shaped and arranged to resist compression, yet contribute to a speedy action of the elastic element in cushioning a load supported by the tire.

A further object of our invention is to combine rubber and felt in a manner as to provide a durable, resilient tire that can be advantageously used in connection with bicycles, automobiles and various types of vehicles.

We attain the above and other objects by a combination and arrangement of parts that will be hereinafter specifically described and then claimed.

Reference will now be had to the drawing, wherein—

Figure 2:
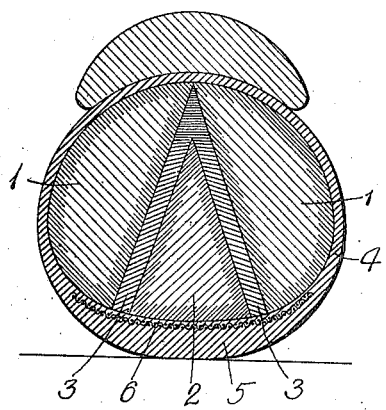
Figure 3:
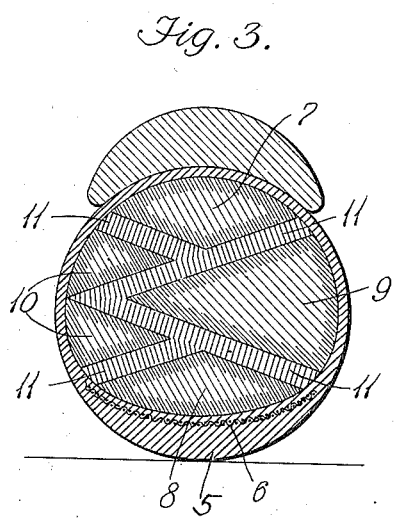
Figure 4:
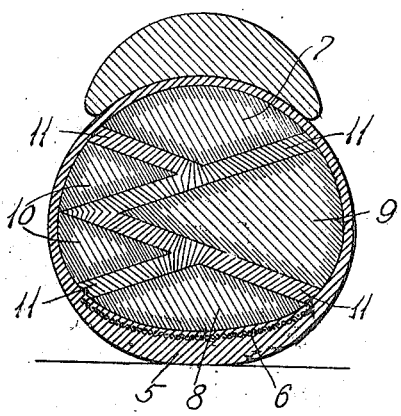

Figure 1 is a cross sectional view of a tire; Fig. 2 is a similar view of the tire when pressure is brought to bear upon the same; Fig. 3 is a cross sectional view of a modified form of tire, such as can be used in connection with heavy vehicles, and Fig. 4 is a similar view of the tire when pressure is brought to bear upon the same.

In describing our invention by aid of the views above referred to, we desire to point out that our invention is not limited to the precise arrangement and shape of parts shown, as the above views are merely illustrative of an example whereby our invention may be applied in practice. The following description is therefore to be broadly construed as including substitute arrangements and construction of parts which are the obvious equivalent of those shown.

In the drawing, 1 denotes side members or elements that are segment shaped in cross section and preferably made of felt, said members being arranged whereby the flat faces thereof will form a groove V-shaped in cross section.

Arranged between the flat faces of the side members 1 is an intermediate member 2 that is sector-shaped in cross section and made of a material similar to the side members 1. The flat faces of the intermediate member 2 confront the flat faces of the side members 1 and the confronting flat faces are maintained in parallelism by an elastic member or element 3 connecting said faces. The elastic member is preferably rubber of the best quality and in connecting the members 1 and 2 said members are impregnated with the rubber to a certain extent, whereby there is a positive connection between said members.

The curved surface of the intermediate member 2 operates with the curved surfaces of the side members 1 in forming a tire that is substantially circular in cross section, and said members are incased by an outer tube or casing 4 also of rubber which impregnates the members 1 and 2 when vulcanized thereon. The outer tube 4 has a thickened tread portion 5 reinforced by canvas 6 or a suitable material. The thickened tread portion 5 forms a base for the intermediate member 2 and when pressure or a load is brought to bear upon the tire, the same tends to flatten and the intermediate member 2 to ride between the side members 1. The elastic member 3 is immediately brought into action and by comparing the section lines of the elastic member (Fig. 2) with the section line of the same member (Fig. 1) it will be observed that the lines of force tend to stretch the greater part of the elastic member while the remaining part thereof is compressed. The intermediate member 2 has the action of an entering wedge that is not only retarded in its movement, but by reason of its connection with the side members, all of said members are immediately restored to their normal position upon the pressure or load being removed. The same principle is embodied in the tire shown in Figs. 3 and 4. This tire comprises top and bottom members 7 and 8, a main intermediate member, auxiliary intermediate members 10, and an elastic member 11 that connects all of said members. The flat faces of the main intermediate member confront the flat faces of the members 7, 8 and 10 and the flat faces of the members 7 and 8 confront the flat faces of the members 10. With the elastic member connecting all of the flat faces, there is a tendency for the main intermediate member 9 and the auxiliary intermediate members 10 to separate when pressure or a load is brought to bear upon the tire; the lines of force being clearly shown in these two figures.

From the foregoing it will be observed that we have devised a simple, durable and inexpensive tire that can be manufactured with considerable facility, and wherein the cross sectional shape of the various members permit of said members coöperating in resisting pressure, and that instead of the cushioning elements being compressed, as is common to a great many tires, the action in connection with our improved tire is really that of stretching. This is accomplished by arranging and shaping the various members whereby the elastic member will be stretched instead of compressed.

What we claim is:

1. A tire comprising side members, an intermediate member having a wedge action between said side members, and an elastic member connecting the confronting sides of said side members and said intermediate member.

2. A tire comprising segment-shaped side members, a sector-shaped intermediate member, and an elastic member connecting said intermediate member to said side members.

3. A tire comprising segment-shaped side members, a sector-shaped intermediate member, an elastic member connecting said intermediate member to said side members, and casing inclosing all of said members.

4. A tire comprising segment-shaped side members having the flat faces thereof disposed to form a groove, a sector-shaped intermediate member arranged in the groove formed by said side members, an elastic member formed integral with the confronting sides of said members, and a casing inclosing all of said members and having a thickened tread portion forming the base of said intermediate member.

In testimony whereof we affix our signatures in presence of two witnesses.

WALTER DRABOLD.
AUGUSTUS P. MOTT.

Witnesses:
ANNA M. DORR,
KARL H. BUTLER.